No. 785,282. PATENTED MAR. 21, 1905.
A. J. WARD & C. WRAGG.
MACHINE FOR CUTTING OR PUNCHING GIRDERS, ANGLE IRONS, &c.
APPLICATION FILED DEC. 22, 1903.

3 SHEETS—SHEET 1.

WITNESSES
H. M. Kuehne
Wm. M. Golden Jr.

INVENTORS
Arthur John Ward
Charles Wragg
BY Richardson
ATTORNEYS

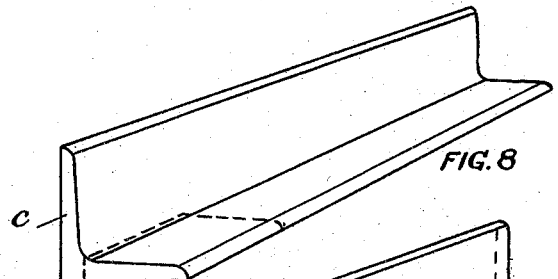
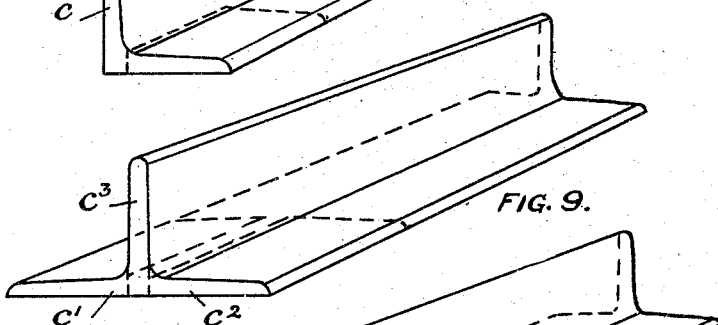
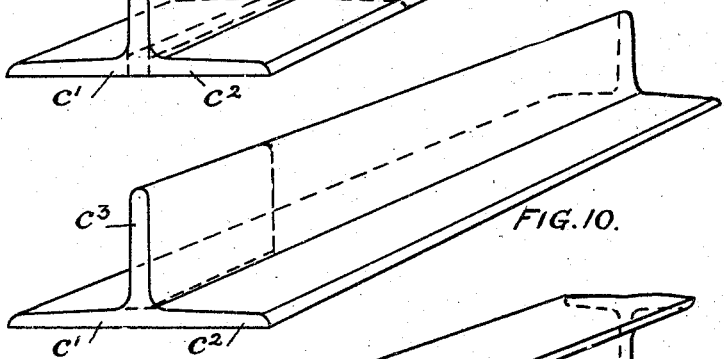
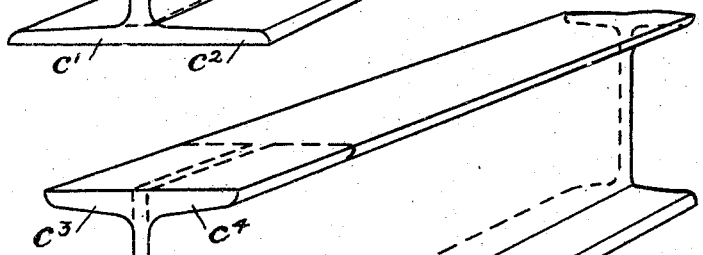
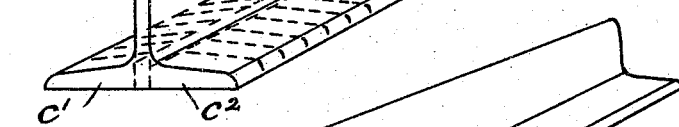

No. 785,282.                                                     Patented March 21, 1905.

UNITED STATES PATENT OFFICE.

ARTHUR JOHN WARD AND CHARLES WRAGG, OF SHEFFIELD, ENGLAND.

MACHINE FOR CUTTING OR PUNCHING GIRDERS, ANGLE-IRONS, &c.

SPECIFICATION forming part of Letters Patent No. 785,282, dated March 21, 1905.

Application filed December 22, 1903. Serial No. 186,219.

*To all whom it may concern:*

Be it known that we, ARTHUR JOHN WARD, residing at 84 Glencoe road, Park, and CHARLES WRAGG, residing at 34 Livingstone road, Meersbrook, Sheffield, in the county of York, England, subjects of the King of Great Britain and Ireland, have invented certain new and useful Improvements in Machines for Cutting or Punching Girders, Angle-Irons, &c., (for which we have filed an application for a patent in Great Britain, No. 28,885, bearing date December 31, 1902,) of which the following is a specification.

The object of our invention is to punch, cut, nick, or otherwise sever by power-machines the ends and other parts of metallic bars of irregular sections which are employed in structural iron-work and to simplify and reduce the expense in certain manipulations of such material, which manipulations by the methods ordinarily employed are executed by hand-tools.

We carry out our invention in the following manner: In some cases we employ an ordinary punching and shearing machine, to which we adapt our improved tools and appliances; but by preference we employ a specially-designed machine, which, although it may be constructed, so far as the power and actuating mechanism is concerned, like an ordinary punching and shearing machine, we form the body or framing so as to render it more convenient and handy for carrying out the object of our invention.

The general features of our invention will be more clearly understood on reference to the accompanying three sheets of drawings, in which—

Figure 1:
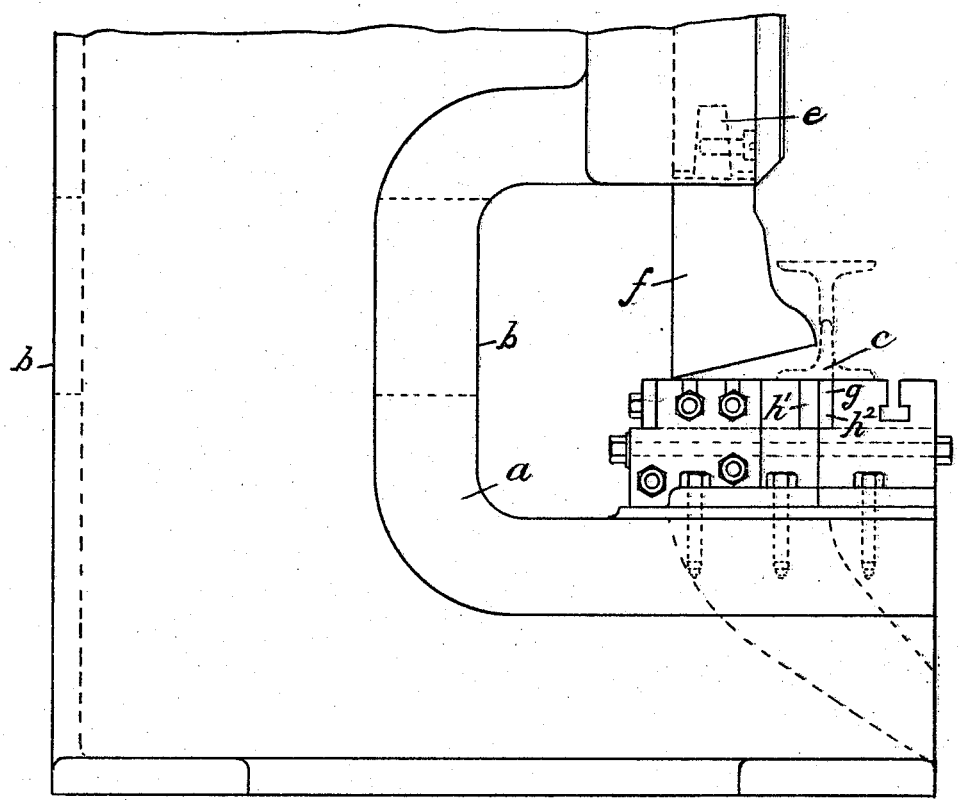
Figure 2:
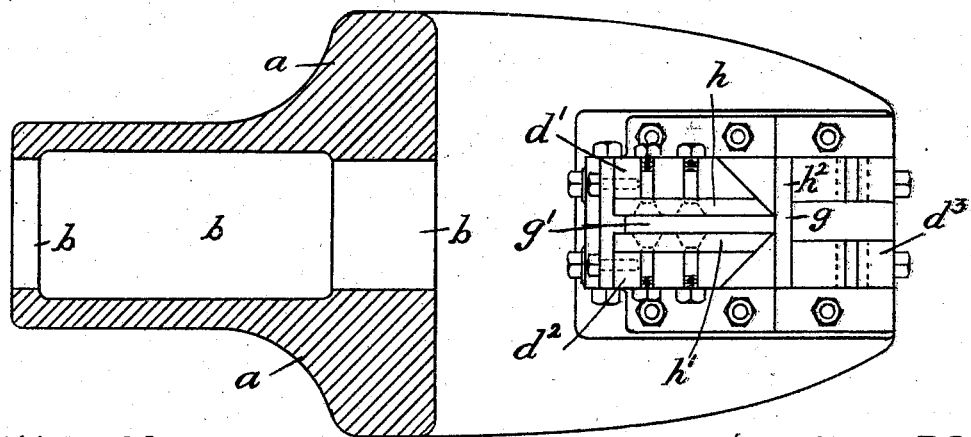
Figure 3:
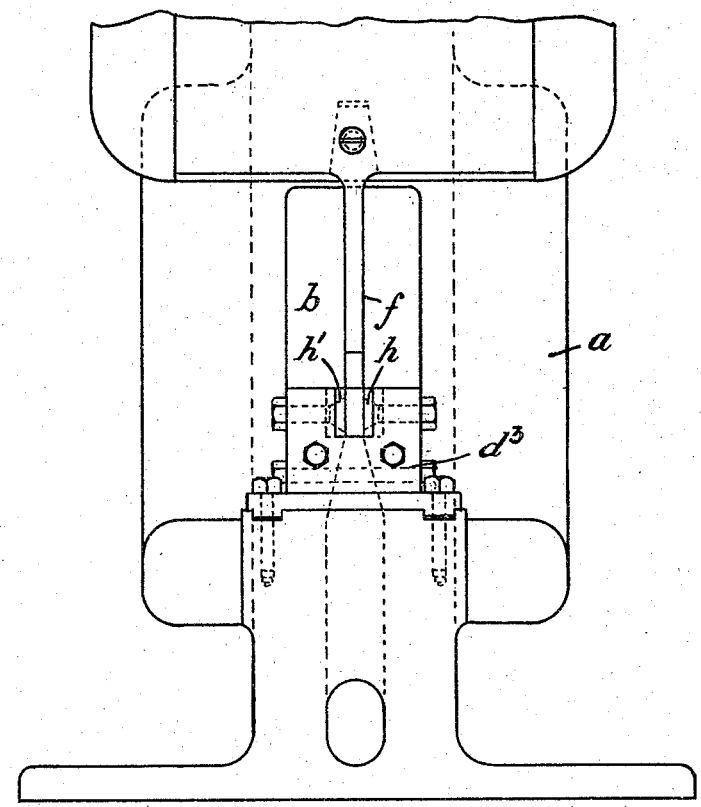

Figure 1 is a side elevation showing our improved tools placed in the gap of a machine such as we should employ for the purpose. Fig. 2 is a plan, partly in section. Fig. 3 is a front elevation. Figs. 4, 5, 6, and 7 are respectively a side elevation, plan, end elevation, and section of the tools or combination of tools shown separate from the machine, the section being taken on the line A B, Fig. 5. Figs. 8, 9, 10, 11, and 12 are views of various kinds of metallic bars, showing how they may be cut by the employment of our invention.

Similar letters refer to similar parts throughout the several views.

We effect the object of our invention by constructing the body or framing $a$ either in two separate sides or flitches or forming it with a gap $b$ wide enough to allow of a bar of angle, T, H, or other irregular sections $c$ being passed longitudinally through the machine from front to back, as well as with the ordinary transverse gap or gaps. The bed of the machine we also construct so that our improved cutting and punching tools and appliances can be more readily fitted and fixed in position and taken out and changed than would be the case in a punching or shearing machine of ordinary construction. The slide or ram $e$ of our improved machine we also construct so that the cutting or punching tools $f$ can be more readily fitted, fixed, and exchanged than would be the case in an ordinary machine. This we effect by forming the slide more like the ram of a slotting machine, which allows the tools a wider range of adjustment and accessibility than is the case in ordinary punching and shearing machines.

Figure 4:
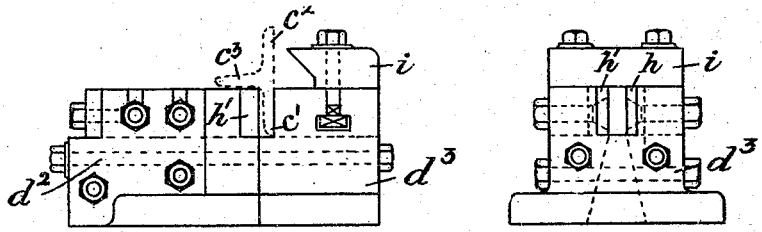

When it is required to cut away a portion of the flange or one of the members at the end of a metal bar of angle, T, or similar section $c$, we employ a shear, cutter, or punch $f$ of the width of such flange or member in conjunction with a bottom cutter block or die $d'$ $d^2$ $d^3$, which is provided with a transverse recess $g$ to receive the flange or member of such angle or T, which is not to be operated upon, and in the case of a T-section the corresponding flange or member would be in line with such recess, as shown in Fig. 4. The flange or web to be cut rests on the bottom block $d'$ $d^2$ at right angles to the recess. The portion of the block carrying the flange or web we provide with a longitudinal recess $g'$ at right angles to the first-named recess $g$ immediately under and in line with the punch $f$. To the sides of this recess $g'$ we fix two steelings or cutters $h$ $h'$, which can be changed or removed, so that the recess can be closed or widened to suit various thicknesses of material. In some cases when cutting or nicking angle-bars we employ a third steeling or cutter $h^2$, laid in the transverse recess $g$. Punching and shearing or cutting tools $f$ of various widths may be employed therewith. In this way, as there are a variable number of cutting edges, according to the section of material being operated upon, a slot or slit can be cleanly cut out of one side of an angle or girder or out of the web of a T-piece.

The three parts $d'$, $d^2$, and $d^3$ of the cutter-block are all removable from the bed of the machine, the parts $d'$ $d^2$ being bolted together transversely. The front part $d^3$ of the bottom cutter block or die is bolted longitudinally to the parts $d'$ $d^2$.

Figure 5:
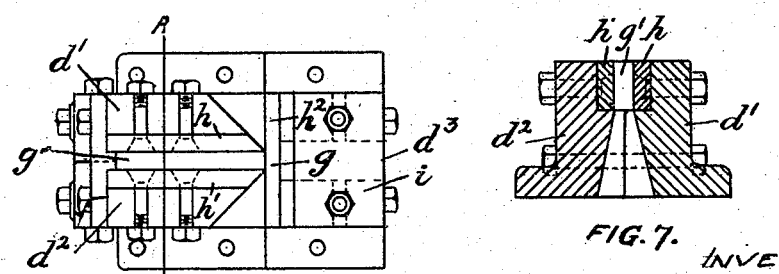
Figure 7:
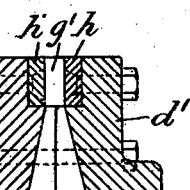

The front ends of the steelings or cutters $h$ $h'$ and also the top front ends of the cutter-blocks $d'$ $d^2$ are beveled so that a metallic bar may be placed diagonally across the die-blocks $d'$, $d^2$, and $d^3$ in order that one side of a miter may be cut in it, when the bar is then turned to the opposite angle on the die-blocks, and the second side of the miter is cut, as shown in Figs. 2 and 5.

Where a double-ended machine is employed, the bar is then removed to the other end of the machine or in same cases to another machine to be cut longitudinally, or this longitudinal cutting or punching operation can be effected in the same single-ended machine by changing or removing the tools or by employing the combination of tools, as shown on Sheet 2, as hereinafter more fully described in the action of our improved appliances. When we change or remove the tools, we employ a top blade only, provided with a cutting edge extended a little lower and of a shorter length than the body of the blade. The shear is operated and the bar cut longitudinally as far as it has been previously cut transversely, when the piece falls out. In this operation a T or in some cases an angle is placed in the machine, so that the stress of the shearing action is received by the flange or member of the piece not being operated upon.

If it is desired to cut away a portion of the web at the end of a metallic bar of H-section, the web would be cut or punched longitudinally by several successive strokes, and then the two edges or flanges would be cut or punched transversely and sometimes transversely and longitudinally by the shear, as previously described.

The action of our improved combination of tools in carrying out the various operations will be as follows: When it is required to cut away a portion of one flange of an angle, as shown in Fig. 8, the angle-bar to be operated upon is presented to the machine transversely, so that the flange to be cut rests across the recess $g'$, as shown in Fig. 1, when the flange is punched or nicked by the shear, cutter, or punch $f$. The bar is then turned at right angles and longitudinally with the recess $g'$, when the flange from the end to the nick previously produced can be cut, sheared, or punched away, and this operation can be executed either on the left or right hand side of the angle-bar, as may be required. The flanges of a T-bar would each be cut in a similar manner, as shown in Fig. 9 and Fig. 1; but in case of the web $c^3$ having to be cut away, as in Fig. 10, in order to get the transverse cut the steeling $h^2$ would be removed from the recess $g$, then the flange $c'$ or $c^2$ placed in the recess $g$, and the web $c^3$ would then lie transversely to the machine across the recess $g'$, as shown in Fig. 4. The web is then punched or nicked by the shear, cutter, or punch $f$. The bar is then withdrawn and the steeling $h$ or $h'$ removed, when the bar is presented to the machine longitudinally, so that the flange $c'$ or $c^2$ rests in the recess $g'$, when the web $c^3$ from the end to the nick previously produced can be cut, sheared, or punched away by the shear, cutter, or punch $f$. In this operation the shearing stress is borne by whichever member or flange ($c'$ or $c^2$) rests in the said longitudinal recess $g'$.

When it is desired to cut away a portion of the four flanges of a bar of H-section, as shown in Fig. 11, the two bottom flanges $c'$ and $c^2$ would each be punched transversely at several successive strokes until the desired length had been cut away, when the bar would then be turned over and the remaining flanges $c^3$ and $c^4$ would be nicked or punched transversely in the same manner, or one nick may be punched in each flange $c^3$ and $c^4$ and then the bar turned at right angles and longitudinally with the recess $g'$, when each flange may be separately cut, punched, or sheared away, as in the case of an angle or T bar.

When it is desired to cut a miter-shaped recess in one flange of any of the foregoing sections—say, for example, an angle-iron, as shown in Fig. 12—the holder $i$, if used, is removed, and the angle-bar would be placed diagonally across the bed of the machine, when the punch $f$ would cut out at one stroke one side of the said miter. The angle-bar would then be turned to the opposite angle on the bed of the machine, when the opposite cut could be made. When the web of a T-bar has to be cut with a miter-shaped recess, the front part $d^3$ of the die-block and the steeling or cutter $h^2$ is removed. The web $c^3$ of the T-bar is then placed diagonally across the top of the die-blocks $d'$ and $d^2$, and the flanges $c'$ and $c^2$ of the T-bar would be in a diagonal vertical position. One side of a miter is then cut, when the T-bar is turned to the opposite angle on the die-blocks and the second side of the miter cut.

Figure 6:
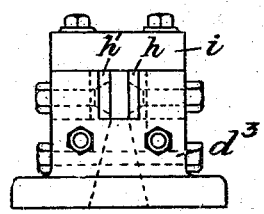

In some cases we employ a cramp or holder $i$ on the front part $d^3$ of the combined tools, as shown in Figs. 4, 5, and 6, Sheet 2.

In cases where our combined tools have to be used on existing machines we fit them onto a separate bed-plate. The bed is then fitted to the gap of the machine.

What we claim, and desire to secure by Letters Patent, is—

In a machine for punching and cutting metal and like bars, the combination with the cutters, a pair of movable blocks forming a recess adjustable as to its width, and a movable block forming a recess extending at right angles to the first-mentioned recess, said second recess being also adjustable as to its width.

In witness whereof we have hereunto set our hands in presence of two witnesses.

ARTHUR JOHN WARD.
    CHARLES WRAGG.

Witnesses:
 R. HEBER RADFORD,
 W. H. BAIRSTO.